US012193488B2

(12) United States Patent
Mironov et al.

(10) Patent No.: US 12,193,488 B2
(45) **Date of Patent: *Jan. 14, 2025**

(54) CARTRIDGE HAVING AN INTERNAL SURFACE SUSCEPTOR MATERIAL

(71) Applicant: Altria Client Services LLC, Richmond, VA (US)

(72) Inventors: Oleg Mironov, Cudrefin (CH); Enrico Stura, Palezieux-Village (CH)

(73) Assignee: Altria Client Services LLC, Richmond, VA (US)

( * ) Notice: Subject to any disclaimer, the term of this patent is extended or adjusted under 35 U.S.C. 154(b) by 672 days.

This patent is subject to a terminal disclaimer.

(21) Appl. No.: 16/353,404

(22) Filed: Mar. 14, 2019

(65) Prior Publication Data

US 2019/0208827 A1 Jul. 11, 2019

Related U.S. Application Data

(63) Continuation of application No. PCT/EP2018/081974, filed on Nov. 20, 2018.

(30) Foreign Application Priority Data

Nov. 30, 2017 (EP) .................................... 17204805

(51) Int. Cl.
*A24F 40/42* (2020.01)
*A24F 40/20* (2020.01)
(Continued)

(52) U.S. Cl.
CPC .............. *A24F 40/42* (2020.01); *A24F 40/20* (2020.01); *A24F 40/10* (2020.01); *A24F 40/465* (2020.01); *H05B 6/105* (2013.01)

(58) Field of Classification Search
CPC ............................... A24F 40/42; A24F 40/465
(Continued)

(56) References Cited

U.S. PATENT DOCUMENTS 8,881,737 B2 * 11/2014 Collett .................. H05B 3/265 131/194
9,820,512 B2 * 11/2017 Mironov ................ A24F 40/42
(Continued)

FOREIGN PATENT DOCUMENTS

CN 1126426 A 7/1996
CN 105307523 A 2/2016
(Continued)

OTHER PUBLICATIONS

Mesh and Micron Sizes, Industrial Specialties Manufacturing, https://www.industrialspec.com/images/files/mesh-micron-sizes-chart-ebook-ism.pdf (Year: 2020).*
(Continued)

*Primary Examiner* — Russell E Sparks
(74) *Attorney, Agent, or Firm* — Harness, Dickey & Pierce, P.L.C.

(57) ABSTRACT

There is provided a cartridge for an aerosol-generating system, the cartridge comprising a container comprising an outer surface and an inner surface, wherein the container outer surface at least partially defines an outer surface of the cartridge. The cartridge also includes a susceptor material comprising a susceptor material inner surface at least partially defining a cartridge cavity, the susceptor material inner surface defining a plurality of interstices. The cartridge also includes an aerosol-forming substrate in the form of a gel at room temperature, plurality of interstices are configured to hold the gel.

17 Claims, 5 Drawing Sheets

(51) Int. Cl.

| | |
|---|---|
| ***A24F 40/465*** | (2020.01) |
| ***H05B 6/10*** | (2006.01) |
| *A24F 40/10* | (2020.01) |

(58) Field of Classification Search

USPC .......................................................... 131/329

See application file for complete search history.

(56) References Cited

U.S. PATENT DOCUMENTS

| | | | | |
|---|---|---|---|---|
| 10,834,968 | B2 * | 11/2020 | John | A24F 40/42 |
| 10,912,329 | B2 * | 2/2021 | Apetrei Birza | A24B 15/167 |
| 11,632,978 | B2 * | 4/2023 | Rojo-Calderon | A24D 1/20 131/111 |
| 2014/0060554 | A1 | 3/2014 | Collett et al. | |
| 2016/0120221 | A1 * | 5/2016 | Mironov | A24F 40/42 392/395 |
| 2016/0150828 | A1 * | 6/2016 | Goldstein | H05B 6/36 392/387 |
| 2017/0055574 | A1 | 3/2017 | Kaufman et al. | |
| 2018/0279681 | A1 * | 10/2018 | Rojo-Calderon | A24B 3/14 |

FOREIGN PATENT DOCUMENTS

| | | | | | |
|---|---|---|---|---|---|
| CN | 105407750 | A | | 3/2016 | |
| CN | 106255429 | A | | 12/2016 | |
| CN | 106455712 | A | | 2/2017 | |
| CN | 107205467 | A | | 9/2017 | |
| JP | 2016-524458 | A | | 8/2016 | |
| JP | 2017-520234 | A | | 7/2017 | |
| WO | WO-2015176898 | A1 | * | 11/2015 | A24B 15/167 |
| WO | WO-2015177046 | A1 | * | 11/2015 | A24F 40/42 |
| WO | WO-2016096780 | A1 | * | 6/2016 | A24B 15/167 |
| WO | WO-2017068094 | A1 | * | 4/2017 | A24C 5/01 |
| WO | WO-2017068095 | A1 | | 4/2017 | |
| WO | WO-2017068099 | A1 | | 4/2017 | |
| WO | WO-2017072148 | A1 | | 5/2017 | |
| WO | WO-2017167932 | A1 | | 10/2017 | |

OTHER PUBLICATIONS

Russian Search report dated Nov. 24, 2021 corresponding to Russian Patent Application No. 2020121397.

Russian Decision to Grant dated Nov. 24, 2021 corresponding to Russian Patent Application No. 2020121397.

International Preliminary Report on Patentability for corresponding Application No. PCT/EP2018/081974, dated Nov. 15, 2019.

International Search Report PCT/ISA/210 for International Application No. PCT/EP2018/081974 Dated Feb. 13, 2019.

Written Opinion of the International Searching Authority PCT/ISA/237 for International Application No. PCT/EP2018/081974 dated Feb. 13, 2019.

European Search Report for European Application No. 17204805 dated Apr. 4, 2018.

Brailian Office Action dated Jul. 21, 2022 for corresponding Brazilian Patent Application No. 1120200087092.

Japanese Notice of Allowance dated of Oct. 31, 2022 for corresponding Japanese Patent Application No. 2020-528008.

Chinese Office Action and Search Report dated Mar. 30, 2023 for corresponding Chinese Patent Application No. 201880071911.X.

Korean Notice of Allowance dated Jul. 11, 2023 for corresponding Korean Patent Application No. 2020-7014256.

Chinese Notice of Allowance, dated Nov. 30, 2023, issued in corresponding Chinese Patent Application No. 201880071911.X.

Office Action dated Feb. 26, 2024 issued in corresponding Japanese Patent Application No. 2023-000157.

Notice of Allowance dated Oct. 15, 2024 issued in corresponding Japanese Patent Application No. 2023-000157.

* cited by examiner

CARTRIDGE HAVING AN INTERNAL SURFACE SUSCEPTOR MATERIAL

CROSS-REFERENCE TO RELATED APPLICATIONS

This application is a continuation of, and claims priority to, international application number PCT/EP2018/081974, filed on Nov. 20, 2018, which claims priority to European patent application number 17204805.0, filed on Nov. 30, 2017, the entire contents of each of which are incorporated herein by reference.

FIELD

Example embodiments relate to a cartridge for an aerosol-generating system, the cartridge comprising a susceptor material having an inner surface defining a plurality of interstices. Example embodiments also relate to an aerosol-generating system comprising the cartridge, and methods of assembling the cartridge.

DESCRIPTION OF RELATED ART

Aerosol-generating systems, such as e-cigarettes, that operate by heating a liquid formulation to generate an aerosol are widely used. They may include a device portion and a cartridge. In some systems, the device portion contains a power supply and control electronics and the cartridge contains a liquid reservoir holding the liquid formulation, a heater for vaporising the liquid formulation, and a wick that transports the liquid from the liquid reservoir to the heater. While this type of system has become popular, it does have several disadvantages. One disadvantage is the potential for leakage of the liquid from the liquid reservoir both during transport and storage, and when the cartridge is connected to the device portion. The use of a wick to transport the liquid from the reservoir to the heater may add complexity to the system. Another disadvantage is the increased cost of the cartridge resulting from the incorporation of the heater within the cartridge.

SUMMARY

At least one example embodiment relates to a cartridge for an aerosol-generating system.

In one embodiment, the cartridge includes a container including an outer surface and an inner surface, the container outer surface at least partially defines an outer surface of the cartridge; a susceptor material including a susceptor material inner surface at least partially defining a cartridge cavity, the susceptor material inner surface defining a plurality of interstices; and an aerosol-forming substrate in the form of a gel at room temperature, wherein plurality of interstices are configured to hold the gel.

In one embodiment, the susceptor material forms at least part of the container, and wherein the susceptor material inner surface forms at least part of the container inner surface.

In one embodiment, the susceptor material includes a susceptor material outer surface, and wherein at least a portion of the susceptor material outer surface is secured to the container inner surface.

In one embodiment, at least a portion of the susceptor material inner surface defines at least one of an airflow passage through the cartridge and a mixing chamber.

In one embodiment, the container includes a tubular portion and a base portion extending across a first end of the tubular portion.

In one embodiment, at least a portion of the susceptor material is disposed at the tubular portion.

In one embodiment, at least a portion of the susceptor material is disposed at the base portion.

In one embodiment, the cartridge further includes a seal extending across a second end of the tubular portion, wherein the seal is sealed to the tubular portion.

In one embodiment, the susceptor material has an annular shape.

In one embodiment, at least some of the plurality of interstices are interconnected with each other.

In one embodiment, at least some of the plurality of interstices are isolated from each other.

In one embodiment, the plurality of interstices form a repeating pattern on the susceptor material inner surface.

In one embodiment, each of the plurality of interstices have a maximum cross-sectional dimension, and wherein a number average of the maximum cross-sectional dimension for the plurality of interstices is between 30 micrometres and 300 micrometres.

In one embodiment, the susceptor material has a thickness in a direction orthogonal to the susceptor material inner surface, wherein an average thickness is less than 3 millimetres.

In one embodiment, the system includes a cartridge; and an aerosol-generating device including a housing defining a device cavity for receiving the cartridge; an electrical heater comprising an inductive heating element arranged to heat the susceptor material when the cartridge is received within the device cavity; an electrical power supply; and a controller for controller a supply of electrical power from the electrical power supply to the electrical heater.

In one embodiment, the method of assembling a cartridge f including providing a container including an inner surface at least partially defining a cartridge cavity; inserting a susceptor material into the cartridge cavity, the susceptor material defining a plurality of interstices; securing the susceptor material to at least a portion of the inner surface of the container; inserting a liquid aerosol-forming substrate into the plurality of interstices; and gelating the liquid aerosol-forming substrate so that the aerosol-forming substrate is in the form of a gel at room temperature, wherein the gel is positioned within the plurality of interstices.

In one embodiment, the method of assembling a cartridge including providing a susceptor material; forming a plurality of interstices on a surface of the susceptor material; forming a container from the susceptor material, the container including an inner surface at least partially defining a cartridge cavity, wherein the surface of the susceptor material comprising the plurality of interstices forms at least a portion of the inner surface of the container; inserting a liquid aerosol-forming substrate into the plurality of interstices; and gelating the liquid aerosol-forming substrate so that the aerosol-forming substrate is in the form of a gel at room temperature, wherein the gel is positioned within the plurality of interstices.

BRIEF DESCRIPTION OF THE DRAWINGS

Features described in relation to one example embodiment may equally be applied to other example embodiments.

Example embodiments will now be described with reference to the following drawings.

DETAILED DESCRIPTION

Figure 1:
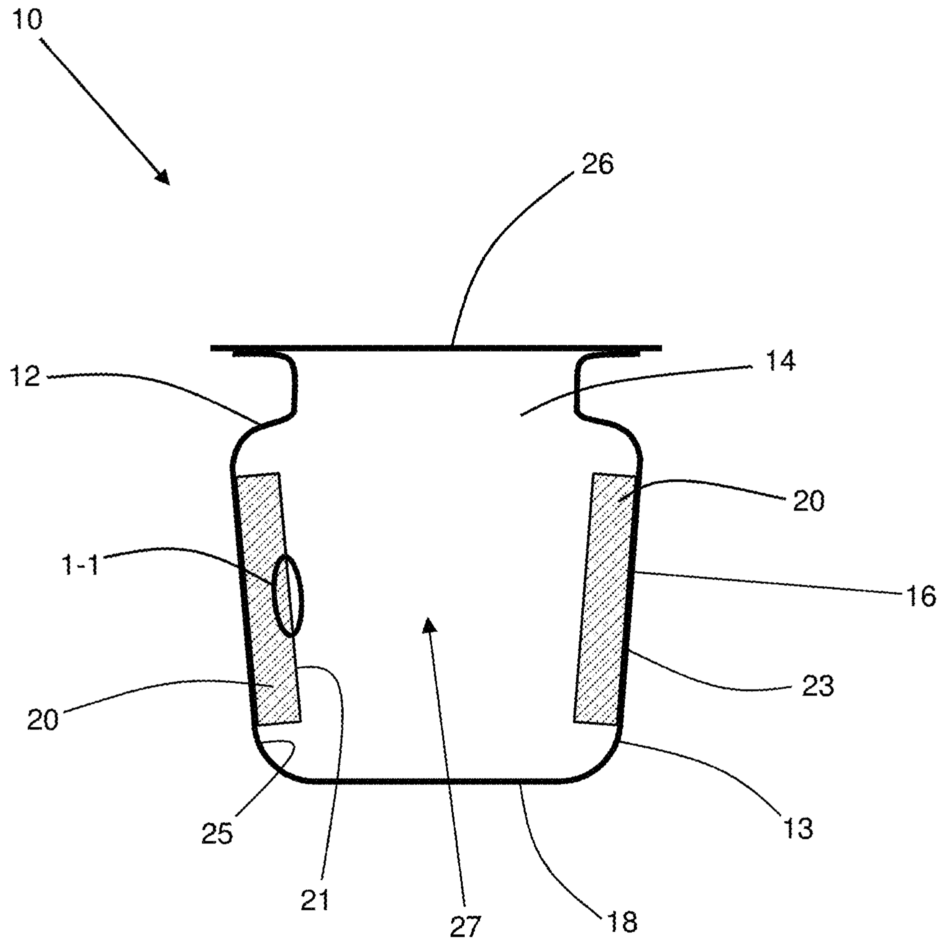
FIG. 1 illustrates a cross-sectional view of a cartridge, in accordance with an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, elements, regions, layers and/or sections, these elements, elements, regions, layers, and/or sections should not be limited by these terms. These terms are only used to distinguish one element, element, region, layer, or section from another region, layer, or section. Thus, a first element, element, region, layer, or section discussed below could be termed a second element, element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or elements, but do not preclude the presence or addition of one or more other features, integers, steps, operations, elements, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

According to a first aspect of the example embodiments there is provided a cartridge for an aerosol-generating system (also referred to as a "vapor-generating system" or vaporizer), the cartridge comprising a container including an outer surface and an inner surface, wherein the container outer surface at least partially defines an outer surface of the cartridge. The cartridge may also include a susceptor material including a susceptor material inner surface at least partially defining a cartridge cavity, the susceptor material inner surface defining a plurality of interstices. The cartridge also includes an aerosol-forming substrate in the form of a gel at room temperature, wherein the gel is positioned within the plurality of interstices.

The term "susceptor" is used herein to refer to a material that is capable of being inductively heated. That is, a susceptor material is capable of absorbing electromagnetic energy and converting it to heat.

The aerosol-forming substrate is in the form of a gel at room temperature. Room temperature in this context means approximately 25 degrees Celsius. A gel is a material that does not flow and has a stable size and shape. Gels have a high liquid content and may be regarded as liquids which do not flow. Typically, the stable nature of a gel results from a cross-linked network within the liquid forming the gel.

The aerosol-forming substrate may be in contact with a susceptor material which facilitates heating of the aerosol-forming substrate without requiring contact between the aerosol-forming substrate and an electrical heater. In one example embodiment, the cartridge may be combined with an aerosol-generating device including an electrical heater in the form of an induction coil, wherein the induction coil heats the susceptor material by inductive heating. Eliminating the need for direct contact between the aerosol-forming substrate and the electrical heater may facilitate reuse of the aerosol-generating device with multiple cartridges without contaminating the electrical heater.

Providing a susceptor material defining a plurality of interstices, wherein the aerosol-forming substrate is positioned within the plurality of interstices, may increase the contact area between the susceptor material and the aerosol-forming substrate. Increasing the contact area between the susceptor material and the aerosol-forming substrate facilitates thermal transfer from the susceptor material to the aerosol-forming substrate. This may minimise the inductive heating of the susceptor material that is required to vaporise the aerosol-forming substrate.

Providing the aerosol-forming substrate in the form of a gel that does not flow at room temperature may facilitate retention of the aerosol-forming substrate within the plurality of interstices prior to heating of the susceptor material. That is, the aerosol-forming substrate cannot flow out of the plurality of interstices while the aerosol-forming substrate remains in a gel form.

In one example embodiment, at least partially defining a cartridge cavity with an inner surface of the susceptor material may facilitate airflow through the cartridge during use. Further, at least partially defining a cartridge cavity with an inner surface of the susceptor material may increase or maximise the surface area of the susceptor material across which air may flow through the cartridge during use.

The susceptor material may form at least part of the container. At least part of the container may be constructed from the susceptor material. In such example embodiments, the susceptor material inner surface forms at least part of the container inner surface.

In one example embodiment, forming at least part of the container from the susceptor material may simplify the manufacture and assembly of the cartridge. For example, the forming the container from the susceptor material may eliminate the need to insert a susceptor material into an already formed container.

In one example embodiment, forming at least part of the container from the susceptor material may facilitate heating of the susceptor material using an external induction coil when compared to embodiments in which a separately formed container is disposed between the induction coil and the susceptor material.

In one example embodiment, the entire container may be formed from the susceptor material.

The susceptor material may include a susceptor material outer surface, wherein at least a portion of the susceptor material outer surface is secured to the container inner surface. In other words, the susceptor material may be formed separately from the container and secured to the inner surface of the container.

In one example embodiment, forming the container separately from the susceptor material may facilitate the selection of optimal materials for the container and the susceptor material. For example, the susceptor material may include a thermally conductive material and the container may be formed from a thermally insulating material.

The susceptor material may be secured to the inner surface of the container using any suitable means. In one example embodiment the susceptor material may be secured to the inner surface of the container using an adhesive. In another example embodiment the susceptor material may be secured to the inner surface of the container using one or more welds.

Part of the susceptor material may form at least part of the container and at least part of the susceptor material may be formed separately from the container and secured to the inner surface of the container.

At least a portion of the susceptor material inner surface may define an airflow passage through the cartridge. During use, volatile or vaporized compounds from the aerosol-forming substrate may mix with airflow within the airflow passage.

At least a portion of the susceptor material inner surface may define a mixing chamber. During use, volatile or vaporized compounds from the aerosol-forming substrate may mix with airflow within mixing chamber.

The susceptor material may have a substantially annular shape. Such arrangements may be in embodiments in which the susceptor material defines at least one of an airflow passage and a mixing chamber. An annular susceptor material may be in embodiments in which the cartridge is used with an aerosol-generating device comprising an induction coil arranged to extend around a portion of the cartridge when the cartridge is received within the aerosol-generating device.

The container may include a tubular portion. The container may include a base portion extending across a first end of the tubular portion. The cartridge cavity may be a blind cavity.

At least a portion of the susceptor material may be disposed at the tubular portion. The tubular portion may be formed from at least part of the susceptor material. The susceptor material may be formed separately from the tubular portion and secured to an inner surface of the tubular portion. In embodiments in which the susceptor material has an annular shape, the annular susceptor material may form the tubular portion or be secured to an inner surface of the tubular portion.

In example embodiments in which the container includes a base portion, at least a portion of the susceptor material may be disposed at the base portion. The base portion may be formed from at least part of the susceptor material. The susceptor material may be formed separately from the base portion and secured to an inner surface of the base portion. Such arrangements may be in embodiments in which the cartridge is used with an aerosol-generating device including an induction coil positioned adjacent the container base portion when the cartridge is received within the aerosol-generating device. An example of such an induction coil may be a flat spiral induction coil, as described herein.

The cartridge may include a seal extending across an end of the tubular portion, wherein the seal is sealed to the tubular portion. In example embodiments in which the container includes a base portion, the seal may extends across a second end of the tubular portion opposite the first end. In one example embodiment, the seal may seal the susceptor material and the aerosol-forming substrate within the cartridge.

The seal may include at least one of a polymeric film and a foil. The seal may include a metallic material. The seal may be secured to the container with at least one of an adhesive and a weld, such as an ultrasonic weld. The seal may be secured to the container about a periphery of an end of the tubular portion.

The seal may include at least one frangible barrier. In example embodiments in which the seal includes a frangible barrier, the cartridge may be configured for use with an aerosol-generating device including a piercing element for rupturing the frangible barrier.

The seal may include at least one removable barrier.

The seal may include a vapor permeable element configured to allow the release of vapor from the cartridge cavity through the vapor permeable element. The vapor permeable element may include at least one of a membrane or a mesh.

The seal may include a pressure activated valve that allows for the release of vapor through the valve when a pressure difference across the valve exceeds a threshold pressure difference.

At least some of the plurality of interstices may be interconnected with each other. Providing a susceptor material with a plurality of interstices that are interconnected may facilitate loading of the interstices with the aerosol-forming substrate during manufacture of the cartridge. For example, in example embodiments in which the aerosol-forming substrate is inserted into the cartridge cavity in a liquid form, the aerosol-forming substrate may be drawn into the plurality of interconnected interstices by a capillary action.

Providing a susceptor material with a plurality of interstices that are interconnected may facilitate release of vaporised aerosol-forming substrate from the susceptor material during heating.

At least some of the plurality of interstices may be isolated from each other. In other words, at least some of the plurality of interstices may be discrete interstices that are not connected to each other. Providing a plurality of interstices that are isolated from each other may provide improved control over the capillarity of the interstices when they are formed in the susceptor material. Controlling the capillarity of the interstices may facilitate control of the flow of the aerosol-forming substrate into the interstices in embodiments in which the aerosol-forming substrate is inserted into the interstices in a liquid form, prior to a gelating step.

The plurality of interstices are formed on the inner surface of the susceptor material. Forming the plurality of interstices on the inner surface of the susceptor material may facilitate the release of vaporised aerosol-forming substrate from the susceptor material during use of the cartridge. Forming the plurality of interstices on the inner surface of the susceptor material may facilitate the use of a susceptor material having a reduced thickness. This may facilitate the use of a container having a reduced or minimised size.

The plurality of interstices may form a repeating pattern on the inner surface of the susceptor material. Providing interstices forming a repeating pattern may facilitate control of the surface area to volume ratio of the interstices. Controlling the surface area to volume ratio of the interstices may facilitate control of the heating of the aerosol-forming substrate by the susceptor material during use of the cartridge.

Providing interstices forming a repeating pattern may facilitate control of the capillarity of the interstices. Controlling the capillarity of the interstice may facilitate control of the flow of the aerosol-forming substrate into the interstices in embodiments in which the aerosol-forming substrate is inserted into the interstices in a liquid form, prior to a gelating step.

The plurality of interstices may include an array of repeating shapes, wherein each shape forms an interstice. The repeating shapes may include one or more of circles, triangles, squares, rectangles, pentagons, hexagons, and other polygonal shapes. The plurality of interstices may form a honeycomb pattern on a surface of the susceptor material.

The susceptor material may include a plurality of protrusions extending from a surface of the susceptor material. The plurality of interstices may be formed between the plurality of protrusions. Each protrusion may be discrete and separate from the adjacent protrusions. In such embodiments, the plurality of interstices may be interconnected to each other, as described herein.

The plurality of interstices may be formed in the inner surface of the susceptor material using any suitable method.

The susceptor material may be 3D printed, wherein the plurality of interstices are formed during the 3D printing process.

The plurality of interstices may be formed by embossing the inner surface of the susceptor material.

The plurality of interstices may be formed by etching the inner surface of the susceptor material. For example, the plurality of interstices may be formed by a chemical etching process.

The plurality of interstices may be formed by any suitable mechanical process. For example, the inner surface of the susceptor material may be machined using a brush, such as a wire brush, to form the plurality of interstices.

The susceptor material may include a metallic wool. The metallic wool may be formed from any of the metallic susceptor materials described herein. In one example embodiment, the metallic wool may include a bundle of metallic filaments, wherein spaces between the metallic filaments form the plurality of interstices.

The susceptor material may include a metallic foam. In one example embodiment, the metallic foam may be an open-cell foam, wherein the open cells form the plurality of interstices.

In one example embodiment, the susceptor material includes a ferromagnetic metallic material. The susceptor material may include at least one of ferritic iron, ferromagnetic steel, stainless steel. In some example embodiments, the susceptor material may include non-ferromagnetic materials, such as aluminium. Different materials will generate different amounts of heat when positioned within electromagnetic fields having similar values of frequency and field strength. Therefore, the susceptor material may be selected to provide a desired power dissipation within a known electromagnetic field.

In example embodiments in which the susceptor material includes stainless steel, the susceptor material may include at least one 400 series stainless steel. Suitable 400 series stainless steels include grade 410, grade 420, and grade 430.

The susceptor material may include a protective coating encapsulating the surface of the susceptor material. The protective coating may prevent direct contact between the susceptor material and the aerosol-forming substrate positioned within the plurality of interstices. This may reduce undesirable chemical reactions between the susceptor material and the aerosol-forming substrate. The protective coating may include at least one of a glass and a ceramic.

Each of the interstices has a maximum cross-sectional dimension, wherein the number average maximum cross-sectional dimension for the plurality of interstices may be at least about 30 micrometres. In one example embodiment, the interstices may each have a maximum dimension of at least about 30 micrometres and may facilitate flow of the aerosol-forming substrate into the interstices in example embodiments in which the aerosol-forming substrate is inserted into the container in a liquid form, prior to a gelating step.

Each of the interstices has a maximum cross-sectional dimension, wherein the number average maximum cross-sectional dimension for the plurality of interstices may be less than about 300 micrometres. In one example embodiment, the interstices may each have a maximum dimension of less than about 300 micrometres and may increase or maximize the surface area to volume ratio of the plurality of interstices, which may facilitate heating of the aerosol-forming substrate during use of the cartridge.

Cross-sectional dimensions of the plurality of interstices may be determined using any suitable method. A suitable method is scanning electron microscopy.

The susceptor material may have a thickness in a direction orthogonal to the susceptor material inner surface, wherein the average thickness is less than about 3 millimetres, further the thickness may be less than about 2 millimetres, and alternatively less than about 1 millimetre. In one example embodiment, the average thickness of the susceptor material is at least about 0.5 millimetres.

A susceptor material having a thickness of less than about 3 millimetres may reduce or minimize the energy required to inductively heat the susceptor material to a desired temperature.

A susceptor material having a thickness of at least about 0.5 millimetres may accommodate a desired number and size of interstices forming the plurality of interstices.

In one example embodiment, the gel is a thermoreversible gel. The term "thermoreversible" is used herein to mean that the gel will become a flowable liquid when heated to a melting temperature and will set into a gel again at a gelation temperature. The gelation temperature maybe at or above room temperature and atmospheric pressure. Atmospheric pressure means a pressure of about 1 atmosphere. The melting temperature may be higher than the gelation temperature.

The gel may have a melting temperature of at least about 50 degrees Celsius, or at least about 60 degrees Celsius, or further at least about 70 degrees Celsius, or alternatively at least about 80 degrees Celsius. The melting temperature in this context means the temperature at which the gel is no longer a non-flowable liquid and begins to flow.

The gel may include a gelling agent. The gel may include at least one of agar, agarose, or sodium alginate. The gel may include Gellan gum. The gel may include a mixture of materials. The gel may include water. The gel may include glycerol. The gel may include water and glycerol.

The gel may include an aerosol-former. As used herein, the term "aerosol-former" refers to any suitable known compound or mixture of compounds that, in use, facilitates formation of a dense and stable aerosol. An aerosol-former is substantially resistant to thermal degradation at the operating temperature of the cartridge. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Example aerosol formers are polyhydric alcohols or mixtures thereof, such as triethylene glycol, 1,3-butanediol and glycerine or polyethylene glycol.

The gel may include at least one of nicotine or a tobacco product. Additionally, or alternatively, the gel may include another target compound. In example embodiments in which the gel includes nicotine, the nicotine may be included in the gel with an aerosol-former. Providing the nicotine in the gel can prevent leakage of the nicotine from the cartridge at room temperature when compared to alternative cartridges in which the nicotine is provided in a liquid at room temperature.

When agar is used as a gelling agent, the gel includes between about 0.5 percent and about 5 percent by weight agar, or between about 0.8 percent and about 1 percent by weight agar. The gel may further include between about 0.1 percent and about 2 percent by weight nicotine. The gel may further include between about 30 percent and about 90 percent by weight glycerine, or between about 70 percent and about 90 percent by weight glycerin. A remainder of the gel may include water and any flavourings.

When Gellan gum is used as a gelling agent, the gel includes between about 0.5 percent and about 5 percent by weight Gellan gum. The gel may further include between about 0.1 percent and about 2 percent by weight nicotine. The gel may further include between about 30 percent and about 99.4 percent by weight glycerin. A remainder of the gel may include water and any flavourings.

In one example embodiment, the gel may include 2 percent by weight nicotine, 70 percent by weight glycerol, 27 percent by weight water and 1 percent by weight agar. In another example embodiment, the gel may include 65 percent by weight glycerol, 20 percent by weight water, 14.3 percent by weight tobacco and 0.7 percent by weight agar.

The cartridge may have any suitable shape. In one example embodiment, the cartridge is substantially cylindrical. As used herein with reference to the example embodiments, the terms "cylinder" and "cylindrical" refer to a substantially right circular cylinder with a pair of opposed substantially planar end faces.

The cartridge may have any suitable size.

The cartridge may have a length of, for example, between about 5 millimetres and about 30 millimetres. In certain example embodiments the cartridge may have a length of about 12 millimetres.

The cartridge may have a diameter of, for example, between about 4 millimetres and about 10 millimetres. In certain example embodiments the cartridge may have a diameter of about 7 millimetres.

At least part of the container may be formed from at least part of the susceptor material. At least part of the container may be formed from separately from the susceptor material. Suitable materials for forming the container include, but are not limited to, metal, aluminium, polymer, polyether ether ketone (PEEK), polyimides, such as Kapton®, polyethylene terephthalate (PET), polyethylene (PE), polypropylene (PP), polystyrene (PS), fluorinated ethylene propylene (FEP), polytetrafluoroethylene (PTFE), epoxy resins, polyurethane resins and vinyl resins.

The container may be formed by any suitable method. Suitable methods include, but are not limited to, deep drawing, injection moulding, blistering, blow forming and extrusion.

The cartridge may include a mouthpiece configured to allow aerosol to be drawn through the mouthpiece. Where the cartridge includes a mouthpiece, the mouthpiece may include a filter. The filter may have a low particulate filtration efficiency or very low particulate filtration efficiency. Alternatively, the mouthpiece may include a hollow tube. The mouthpiece may include an airflow modifier, for example a restrictor.

The cartridge may be provided within a mouthpiece tube. The mouthpiece tube may include an aerosol-forming chamber. The mouthpiece tube may include an airflow restrictor. The mouthpiece tube may include a filter. The mouthpiece tube may include a cardboard housing. The mouthpiece tube may include one or more vapor impermeable elements within the cardboard tube. The mouthpiece tube may have a diameter similar to a conventional cigarette, for example about 7 millimetres. The mouthpiece tube may have a mouth end configured to allow aerosol to be drawn through the mouthpiece there through. The cartridge may be held in the mouthpiece tube, for example at an opposite end to the mouth end.

According to a second aspect of the example embodiments, there is provided an aerosol-generating system comprising an aerosol-generating device and a cartridge according to the first aspect of the example embodiments, in accordance with any of the embodiments described herein. The aerosol-generating device includes a housing defining a device cavity for receiving the cartridge, and an electrical heater including an inductive heating element arranged to heat the susceptor material when the cartridge is received within the device cavity. The aerosol-generating device further includes an electrical power supply and a controller for controlling a supply of electrical power from the electrical power supply to the electrical heater.

The inductive heating element may include at least one induction coil extending around at least a portion of the device cavity. The induction coil may extend completely around the device cavity. The induction coil may be wound around the device cavity with a plurality of windings.

The inductive heating element may include at least one planar induction coil. At least one planar induction coil may include a flat spiral induction coil.

As used herein a “flat spiral induction coil” means a coil that is generally planar, wherein the axis of winding of the coil is normal to the surface in which the coil lies. In some embodiments, the flat spiral coil may be planar in the sense that it lies in a flat Euclidean plane. However, the term “flat spiral induction coil” as used herein covers coils that are shaped to conform to a curved plane or other three dimensional surface. For example, a flat spiral coil may be shaped to conform to a cylindrical housing or cavity of the device. The flat spiral coil can then be said to be planar but conforming to a cylindrical plane, with the axis of winding of the coil normal to the cylindrical plane at the centre of the coil. If the flat spiral coil conforms to a cylindrical plane or non-Euclidian plane, the flat spiral coil may lie in a plane having a radius of curvature in the region of the flat spiral coil greater than a diameter of the flat spiral coil.

The power source may be a battery, such as a rechargeable lithium ion battery. Alternatively, the power source may be another form of charge storage device such as a capacitor. The power source may require recharging. The power source may have a capacity that allows for the storage of enough energy for one or more uses of the device. For example, the power source may have sufficient capacity to allow for the continuous generation of aerosol for a period of around six minutes, corresponding to the typical time taken to smoke a conventional cigarette, or for a period that is a multiple of six minutes. In another example, the power source may have sufficient capacity to allow for a predetermined number of puffs or discrete activations.

The controller and the electrical power supply may be configured so that, during, use, a high frequency oscillating current is passed through the inductive heating element to generate an alternating magnetic field that induces a voltage in the susceptor material. As used herein, a “high frequency oscillating current” means an oscillating current having a frequency of between about 125 kilohertz and about 30 megahertz. The high frequency oscillating current may have a frequency of between about 1 megahertz and about 30 megahertz, or between about 1 megahertz and about 10 megahertz or alternatively, between about 5 megahertz and about 7 megahertz.

The aerosol-generating device may be portable. The aerosol-generating device may have a size comparable to a conventional cigar or cigarette. The aerosol-generating device may have a total length between approximately 30 millimetres and approximately 150 millimetres. The aerosol-generating device may have an external diameter between approximately 5 millimetres and approximately 30 millimetres.

According to a third aspect of the example embodiments, there is provided a method of assembling a cartridge for an aerosol-generating system, the method including providing a container defining a cartridge cavity and inserting a susceptor material into the cartridge cavity, the susceptor material defining a plurality of interstices. The method also includes securing the susceptor material to at least a portion of the inner surface of the container. The method may also include inserting a liquid aerosol-forming substrate into the plurality of interstices and gelating the liquid aerosol-forming substrate to form a gel that is solid at room temperature, wherein the gel is positioned within the plurality of interstices. The cartridge may be a cartridge according to the first aspect of the example embodiments, in accordance with any of the embodiments described herein.

The term “gelating” is used herein to refer to the conversion of a liquid into a gel.

During the step of inserting the liquid aerosol-forming substrate into the plurality of interstices, the liquid aerosol-forming substrate may be at an elevated temperature above room temperature. The liquid aerosol-forming substrate may be at a temperature of at least about 50 degrees Celsius.

The step of gelating the liquid aerosol-forming substrate may include cooling the liquid aerosol-forming substrate. In example embodiments in which the liquid aerosol-forming substrate is inserted into the plurality of interstices at an elevated temperature, the liquid aerosol-forming substrate may be cooled to room temperature during the gelating step. The gel may be a thermoreversible gel, as described herein with respect to the first aspect of the example embodiments. The liquid aerosol-forming substrate may include a gelling agent, as described herein with respect to the first aspect of the example embodiments.

The step of securing the susceptor material to at least a portion of the inner surface of the container may include securing the susceptor material using at least one of an adhesive and a weld.

The container may include a tubular portion and base portion, as described herein with respect to the first aspect of the example embodiments. The method may further include positioning a seal across an open end of the tubular portion of the container and sealing the seal to the tubular portion so that the susceptor material and the gel are sealed within the cartridge cavity by the seal. The seal may be positioned across the open end of the tubular portion before or after the gelating step. The seal may include any of the features described herein with respect to the first aspect of the example embodiments.

Cartridges assembled according to the method of the third aspect of the example embodiments may include any of the features described herein with respect to the first aspect of the example embodiments.

According to a fourth aspect of the example embodiments, there is provided a method of assembling a cartridge for an aerosol-generating system, the method including providing a susceptor material and forming a plurality of interstices on a surface of the susceptor material. The method also includes forming a container from the susceptor material, the container comprising an inner surface at least partially defining a cartridge cavity, wherein the surface of the susceptor material comprising the plurality of interstices forms at least a portion of the inner surface of the container. The method also includes inserting a liquid aerosol-forming substrate into the plurality of interstices and gelating the liquid aerosol-forming substrate so that the aerosol-forming substrate is in the form of a gel at room temperature, wherein the gel is positioned within the plurality of interstices.

During the step of inserting the liquid aerosol-forming substrate into the plurality of interstices, the liquid aerosol-forming substrate may be at an elevated temperature above room temperature. For example, the liquid aerosol-forming substrate is at a temperature of at least about 50 degrees Celsius.

The step of gelating the liquid aerosol-forming substrate may include cooling the liquid aerosol-forming substrate. In example embodiments in which the liquid aerosol-forming substrate is inserted into the plurality of interstices at an elevated temperature, the liquid aerosol-forming substrate may be cooled to room temperature during the gelating step. The gel may be a thermoreversible gel, as described herein with respect to the first aspect of the example embodiments. The liquid aerosol-forming substrate may include a gelling agent, as described herein with respect to the first aspect of the example embodiments.

The container may include a tubular portion and base portion, as described herein with respect to the first aspect of the example embodiments. The method may further include positioning a seal across an open end of the tubular portion of the container and sealing the seal to the tubular portion so that the gel is sealed within the cartridge cavity by the seal. The seal may be positioned across the open end of the tubular portion before or after the gelating step. The seal may include any of the features described herein with respect to the first aspect of the example embodiments.

Cartridges assembled according to the method of the fourth aspect of the example embodiments may include any of the features described herein with respect to the first aspect of the example embodiments.

FIG. 1 illustrates a cross-sectional view of a cartridge, in accordance with an example embodiment. The cartridge 10 includes a container 12 partially defining a cartridge cavity 14, the container 12 comprising a tubular portion 16 and a base portion 18. An outer surface 13 of the container 12 partially defines an outer surface of the cartridge 10. Positioned within the cartridge cavity 14 is a susceptor material 20 having an annular shape, the susceptor material 20 having an inner surface 21 partially defining the cartridge cavity 14 and an outer surface 23. The susceptor material 20 includes a sheet of ferromagnetic stainless steel that is adhered at its outer surface 23 to an inner surface 25 of the tubular portion 16 of the container 12. The annular shape of the susceptor material 20 defines a space 27 that may function as at least one of a mixing chamber and an airflow channel during use of the cartridge 10.

The cartridge 10 also includes a seal 26 extending across an open end of the tubular portion 16, the seal comprising a frangible barrier and secured to the container 12 about a periphery of the open end of the tubular portion 16 by an ultrasonic weld.

Figure 2:
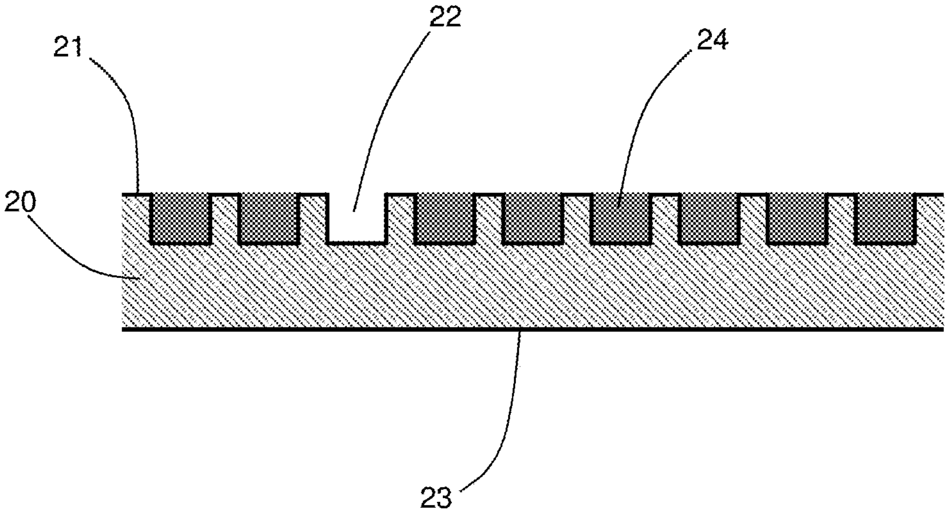
FIG. 2 illustrates an enlarged cross-sectional view of the portion of the susceptor material at 1-1 in FIG. 1, in accordance with an example embodiment.

FIG. 2 illustrates an enlarged cross-sectional view of the portion of the susceptor material at 1-1 in FIG. 1, in accordance with an example embodiment. A plurality of interstices 22 are formed on the inner surface 21 of the susceptor material 20. The container 10 further includes an aerosol-forming substrate 24 positioned within the plurality of interstices 22 of the susceptor material 20. At room temperature, the aerosol-forming substrate 24 is in the form of a gel, which prevents the aerosol-forming substrate 24 flowing out of the plurality of interstices 22. The gel is a thermoreversible gel so that heating the gel to at least 50 degrees Celsius melts the gel such that the aerosol-forming substrate 24 has a liquid form.

Figure 3:
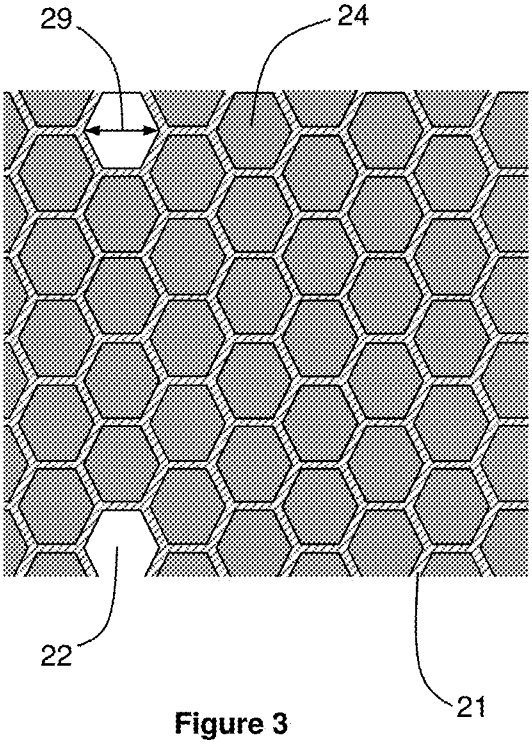
FIG. 3 illustrates a plan view of a portion of the inner surface of the susceptor material of FIG. 2, in accordance with an example embodiment.

FIG. 3 illustrates a plan view of a portion of the inner surface of the susceptor material of FIG. 2, in accordance with an example embodiment. Each of the interstices 22 has a hexagonal shape so that the plurality of interstices 22 form a honeycomb arrangement on the inner surface 21 of the susceptor material 20. The interstices 22 may be formed by embossing the inner surface 21 of the susceptor material 20. To provide a balance between a desirable capillarity and a desirable surface area to volume ratio of the interstices 22, each interstice 22 has a maximum width 29 of between about 30 micrometres and about 300 micrometres.

Figure 4:
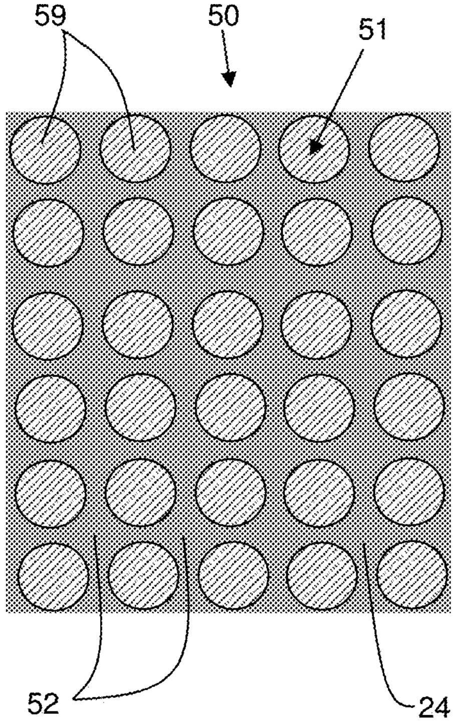
FIG. 4 illustrates a plan view of a portion of an inner surface of a susceptor material, in accordance with an example embodiment.

FIG. 4 illustrates a plan view of a portion of an inner surface of a susceptor material, in accordance with an example embodiment. The susceptor material 50 includes a plurality of protrusions 59 formed on the inner surface 51 of the susceptor material 50. The plurality of protrusions 59 define a plurality of interconnected interstices 52 between the plurality of protrusions 59. A continuous layer of the aerosol-forming substrate 24 is positioned in the plurality of interconnected interstices 52.

Figure 5:
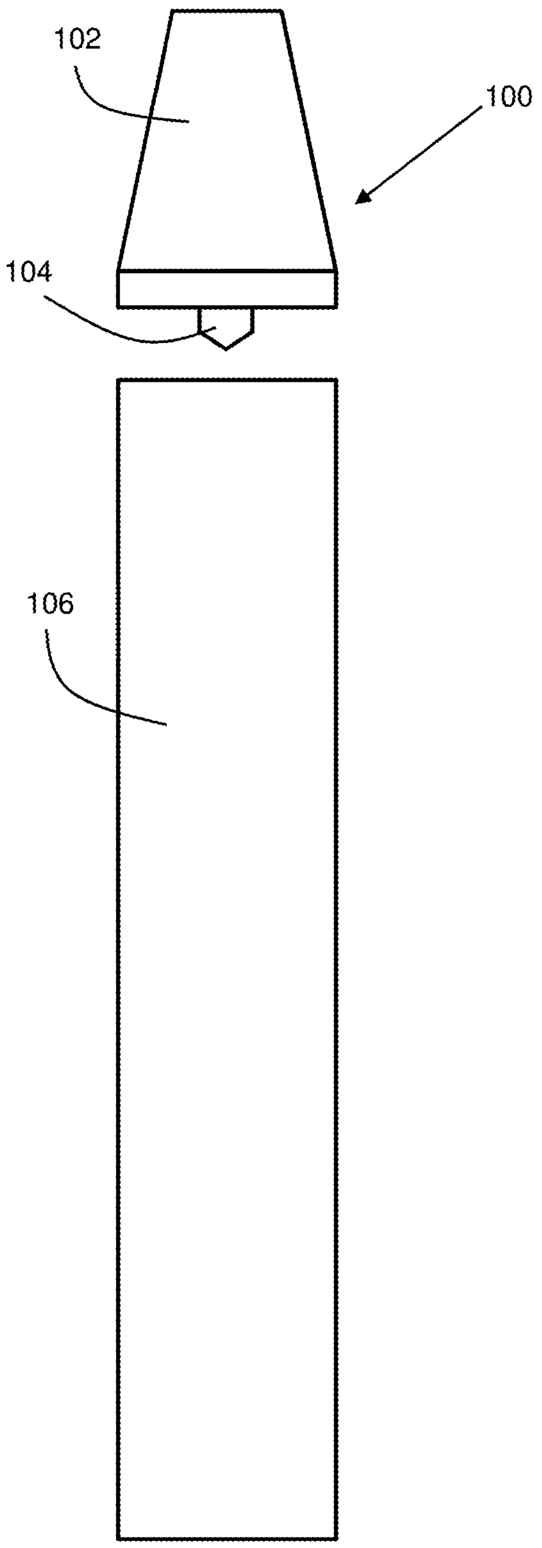
FIG. 5 illustrates a side view of an aerosol-generating system, in accordance with an example embodiment.
Figure 6:
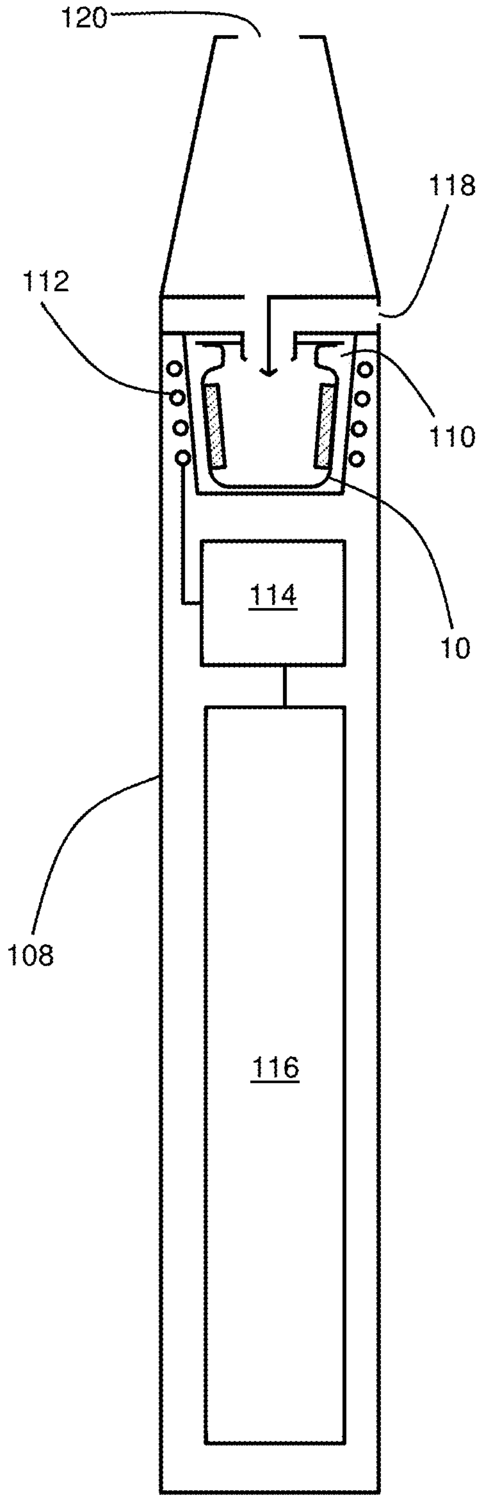
FIG. 6 illustrates a cross-sectional view of the aerosol-generating system of FIG. 5, in accordance with an example embodiment.

FIG. 5 illustrates a side view of an aerosol-generating system, in accordance with an example embodiment. FIG. 6 illustrates a cross-sectional view of the aerosol-generating system of FIG. 5, in accordance with an example embodiment.

The aerosol-generating system 100 includes the cartridge 10 of FIG. 1, a mouthpiece 102 having a piercing element 104 extending therefrom, and an aerosol-generating device 106. FIG. 5 shows the mouthpiece 102 separated from the aerosol-generating device 106 and FIG. 6 shows the mouthpiece 102 connected to the aerosol-generating device 106.

The aerosol-generating device 106 includes a housing 108 defining a device cavity 110 for receiving the cartridge 10. When the cartridge 10 is received within the device cavity 110 and the mouthpiece 102 is connected to the aerosol-generating device 106, the piercing element 104 ruptures the seal 26 of the cartridge 10 so that at least a portion of the piercing element 104 is received within the cartridge cavity 14.

The aerosol-generating device 106 also includes an electrical heater comprising an inductive heating element 112. The inductive heating element 112 includes an induction coil positioned within the housing 108 and wrapped around the device cavity 110. Also positioned within the housing 108 are a controller 114 and an electrical power supply 116. During use, the controller 114 controls a supply of an oscillating electrical current from the electrical power supply 116 to the inductive heating element 112. The oscillating electrical current within the inductive heating element generates an alternating magnetic field that induces a voltage within the susceptor material 20 of the cartridge 10. The induced voltage heats the susceptor material 20, which heats the aerosol-forming substrate 24. The heated aerosol-forming substrate 24 melts and vaporises to form a vapor within the space 27 in the cartridge cavity 14. The mouthpiece 102 may be drawn on to draw air into the aerosol-generating system 100 via an airflow inlet 118. The air entering the airflow inlet 118 flows into the cartridge cavity 14 via a first airflow aperture in the piercing element 104, and out of the cartridge cavity 14 via a second airflow aperture in the piercing element 104. As the air flows through the cartridge cavity 14 and the space 27 defined by the annular shape of the susceptor element 20, the vaporised aerosol-forming substrate 24 is entrained in the airflow. The airflow and the vapor entrained therein flow from the second airflow aperture via an airflow outlet 120 in the mouthpiece 102.

Figure 7:
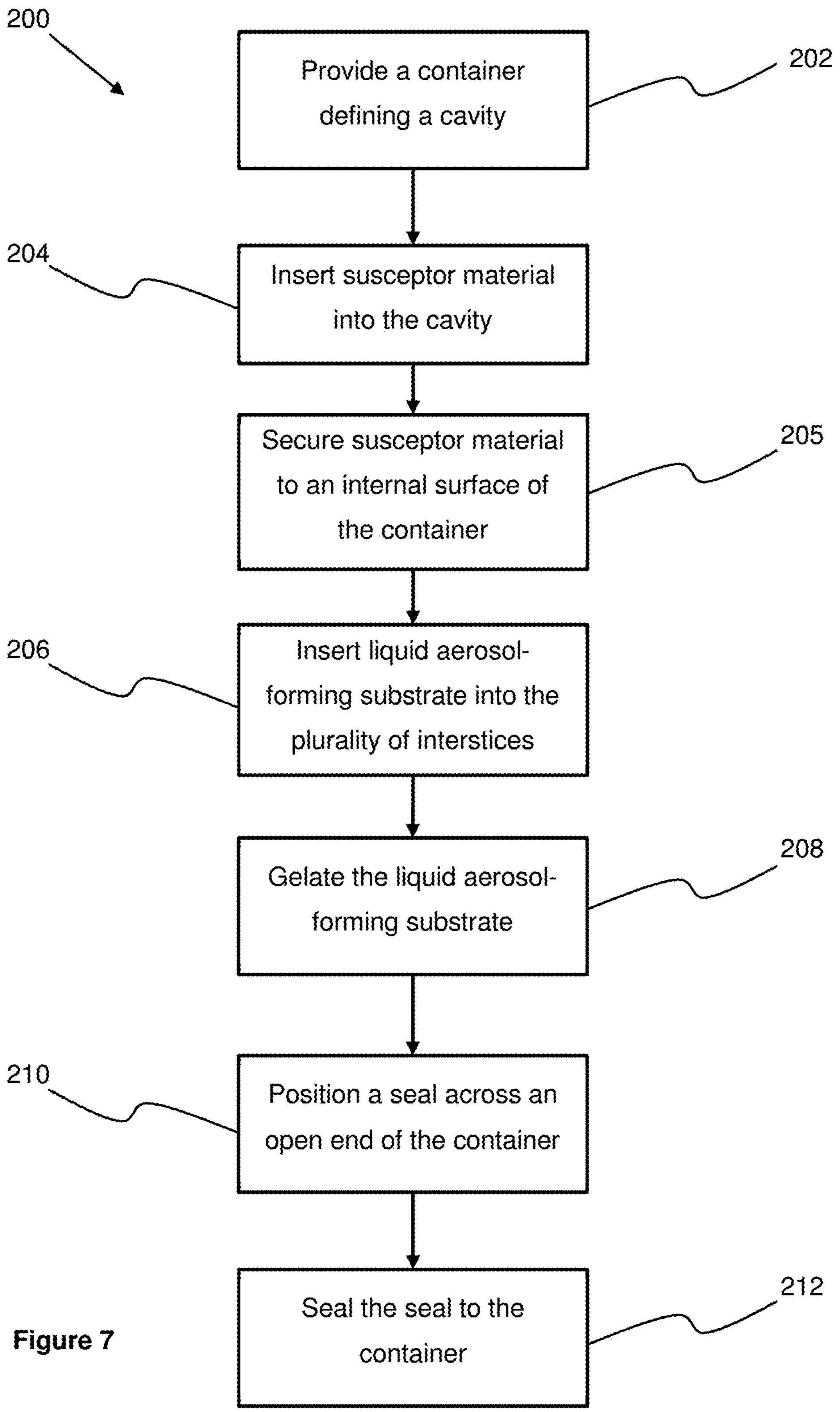
FIG. 7 illustrates a flow diagram of a first method of assembling a cartridge, in accordance with an example embodiment.

FIG. 7 illustrates a flow diagram of a first method of assembling a cartridge, in accordance with an example embodiment. In a first step 202 a container is provided, the container having an inner surface partially defining a cartridge cavity. In a second step 204, a susceptor material is inserted into the cartridge cavity. The susceptor material defines a plurality of interstices. In a third step 205, the susceptor material is secured to at least a portion of the inner surface of the container. In a fourth step 206, a liquid aerosol-forming substrate is inserted into the plurality of interstices of the susceptor material. In a fifth step 208, the liquid aerosol-forming substrate is gelated to form a gel. In a sixth step 210, a seal is positioned across an open end of the container. In a seventh step 212, the seal is sealed to the container, for example, by an ultrasonic weld.

Figure 8:
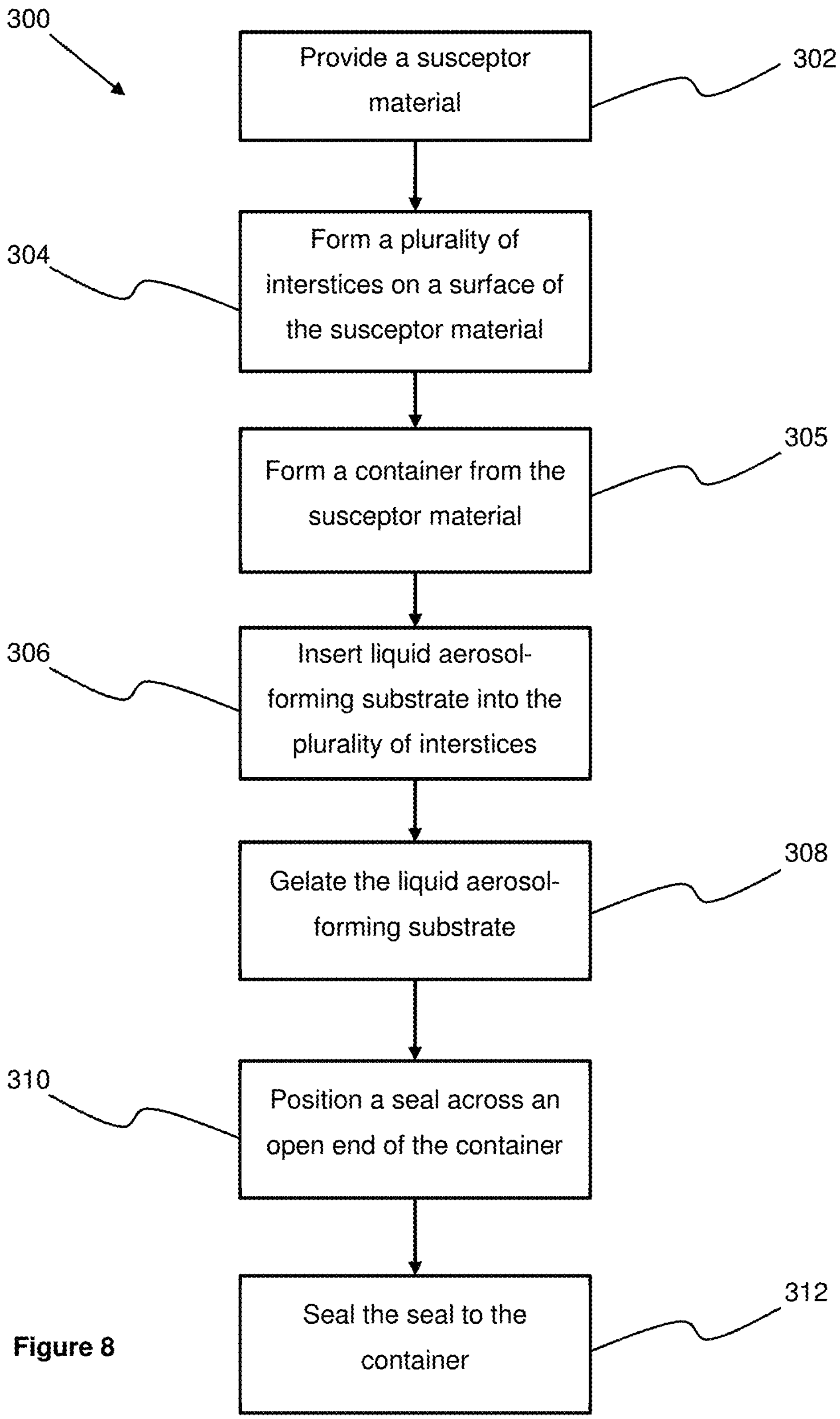
FIG. 8 illustrates a flow diagram illustrating a second method of assembling a cartridge, in accordance with an example embodiment.

FIG. 8 illustrates a flow diagram illustrating a second method of assembling a cartridge, in accordance with an example embodiment. In a first step 302 a susceptor material is provided. In a second step 304, a plurality of interstices are formed on a surface of the susceptor material. In a third step 305, a container is formed from the susceptor material so that the surface of the susceptor material comprising the plurality of interstices forms an inner surface of the container. In a fourth step 306, a liquid aerosol-forming substrate is inserted into the plurality of interstices of the susceptor material. In a fifth step 308, the liquid aerosol-forming substrate is gelated to form a gel. In a sixth step 310, a seal is positioned across an open end of the container. In a seventh step 312, the seal is sealed to the container, for example, by an ultrasonic weld.

The invention claimed is:

1. A cartridge for an aerosol-generating system, the cartridge comprising:

a container including an outer surface and an inner surface, the container outer surface at least partially defines an outer surface of the cartridge;

a susceptor material extending along the inner surface of the container, the susceptor material including a susceptor material inner surface at least partially defining a cartridge cavity, the susceptor material inner surface defining a plurality of interstices, the plurality of interstices each having a depth less than a thickness of the susceptor material in a same direction, extending from a central axis of the container towards the outer surface of the container, and being on a planar surface of the susceptor material; and an aerosol-forming substrate in the form of a gel at room temperature, wherein the gel is positioned within the plurality of interstices.

2. The cartridge according to claim 1, wherein the susceptor material forms at least part of the container, and wherein the susceptor material inner surface forms at least part of the container inner surface.

3. The cartridge according to claim 1, wherein the susceptor material includes a susceptor material outer surface, and wherein at least a portion of the susceptor material outer surface is secured to the container inner surface.

4. The cartridge according to claim 1, wherein at least a portion of the susceptor material inner surface defines an airflow passage through the cartridge and a mixing chamber.

5. The cartridge according to claim 1, wherein the container includes a tubular portion and a base portion extending across a first end of the tubular portion.

6. The cartridge according to claim 5, wherein at least a portion of the susceptor material is disposed at the tubular portion.

7. The cartridge according to claim 5, wherein at least a portion of the susceptor material is disposed at the base portion.

8. The cartridge according to claim 5, further comprising a seal extending across a second end of the tubular portion, wherein the seal is sealed to the tubular portion.

9. The cartridge according to claim 1, wherein the susceptor material has an annular shape along the inner surface of the cartridge.

10. The cartridge according to claim 1, wherein at least some of the plurality of interstices are interconnected with each other.

11. The cartridge according to claim 1, wherein at least some of the plurality of interstices are isolated from each other.

12. The cartridge according to claim 1, wherein the plurality of interstices form a repeating pattern on the susceptor material inner surface.

13. The cartridge according to claim 1, wherein each of the plurality of interstices have a maximum cross-sectional dimension, and wherein an average of the maximum cross-sectional dimension for the plurality of interstices is between 30 micrometres and 300 micrometres.

14. The cartridge according to claim 1, wherein the susceptor material has a thickness in a direction orthogonal to the susceptor material inner surface, wherein an average thickness is less than 3 millimetres.

15. The cartridge according to claim 1, wherein the susceptor material inner surface includes a series of protrusions defining the plurality of interstices.

16. An aerosol-generating system comprising:

the cartridge according to claim 1; and an aerosol-generating device comprising:

a housing defining a device cavity for receiving the cartridge;

an electrical heater comprising an inductive heating element arranged to heat the susceptor material when the cartridge is received within the device cavity;

an electrical power supply; and a controller for controller a supply of electrical power from the electrical power supply to the electrical heater.

17. A method of assembling a cartridge for an aerosol-generating system, the method comprising:

providing a container including an inner surface at least partially defining a cartridge cavity;

inserting a susceptor material into the cartridge cavity extending along the inner surface of the container, the susceptor material defining a plurality of interstices, the plurality of interstices each having a depth less than a thickness of the susceptor material in a same direction, extending from a central axis of the container towards an outer surface of the container, and being on a planar surface of the susceptor material;

securing the susceptor material to at least a portion of the inner surface of the container;

inserting a liquid aerosol-forming substrate into the plurality of interstices; and gelating the liquid aerosol-forming substrate so that the aerosol-forming substrate is in the form of a gel at room temperature, wherein the gel is positioned within the plurality of interstices.

* * * * *